United States Patent
Lambert

(10) Patent No.: US 8,420,045 B2
(45) Date of Patent: *Apr. 16, 2013

(54) USE OF REDOX MASS HAVING A SPINEL TYPE STRUCTURE FOR A LOOPING REDOX PROCESS

(75) Inventor: Arnold Lambert, Chavanay (FR)

(73) Assignee: IFP, Cedex (FR)

( * ) Notice: Subject to any disclaimer, the term of this patent is extended or adjusted under 35 U.S.C. 154(b) by 128 days.

This patent is subject to a terminal disclaimer.

(21) Appl. No.: 12/746,600

(22) PCT Filed: May 16, 2008

(86) PCT No.: PCT/FR2008/000696
§ 371 (c)(1),
(2), (4) Date: Sep. 24, 2010

(87) PCT Pub. No.: WO2009/074729
PCT Pub. Date: Jun. 18, 2009

(65) Prior Publication Data
US 2011/0002826 A1    Jan. 6, 2011

(30) Foreign Application Priority Data
Dec. 10, 2007 (FR) .................... 07 08640

(51) Int. Cl.
*C07C 1/04* (2006.01)
(52) U.S. Cl.
USPC ............ 423/594.1; 423/224; 423/437.1; 502/324; 502/331; 252/373; 60/772
(58) Field of Classification Search .......... 423/224, 423/594.1, 437.1; 60/645, 772, 39.05, 39.461, 60/39.464; 431/2, 4, 5; 110/204; 432/58; 502/324, 331
See application file for complete search history.

(56) References Cited

U.S. PATENT DOCUMENTS

| 5,447,024 A | 9/1995 | Ishida et al. |
| 2006/0024221 A1* | 2/2006 | Lebas et al. ............ 422/188 |
| 2007/0049489 A1* | 3/2007 | Becue et al. ............ 502/304 |

FOREIGN PATENT DOCUMENTS

| EP | 1 747 813 A1 | 1/2007 |
| FR | 2 846 710 A1 | 5/2004 |
| FR | 2 873 750 A1 | 2/2006 |

OTHER PUBLICATIONS

P.J.M. van der Straten et al., LPE growth of Mn-, Ni- and Al-substituted copper ferrite films, Journal of Applied Physics, Jun. 1980, pp. 3239-3240, vol. 51, No. 6.
Fang He et al., Application of $Fe_2O_3/Al_2O_3$ Composite Particles as Oxygen Carrier of Chemical Looping Combustion, Journal of Natural Gas Chemistry, Feb. 2007, pp. 155-161, vol. 16.
Tobias Mattisson et al., Reactivity of Some Metal Oxides Supported on Alumina with Alternating Methane and Oxygen-Application for Chemical-Looping Combustion, Energy & Fuels, 2003, 17, pp. 643-651.
Luis de Diego et al., Development of Cu-based Oxygen Carriers for Chemical-Looping Combustion, Fuel, 2004, pp. 1749-1757.
Luis de Diego et al., Impregnated $CuO/Al_2O_3$ Oxygen Carriers for Chemical-Looping Combustion : Avoiding Fluidized Bed Agglomeration, Energy & Fuels, 2005, pp. 1850-1856.
Paul Cho et al., Comparison of Iron-, Nickel-, Copper- and Manganese-based Oxygen Carriers for Chemical-Looping Combustion, Fuels, 2004, pp. 1215-1225.
Paul Cho et al., Carbon Formation on Nickel and iron Oxide-Containing Oxygen Carriers for Chemical-Looping Combustion, Ind. Eng. Chem. Res., 2005, pp. 668-676.

* cited by examiner

*Primary Examiner* — Steven Bos
(74) *Attorney, Agent, or Firm* — Antonelli, Terry, Stout & Kraud, LLP.

(57) ABSTRACT

The invention relates to the use of a novel type of active mass in looping redox processes. Said mass contains a spinel of formula $Cu_{1-x}Fe_{1+x}AlO_4$ with $0 \leq x \leq 0.1$. The active mass according to the invention has a high oxygen transfer capacity and improved oxidation and reduction rates.

Figure 1:
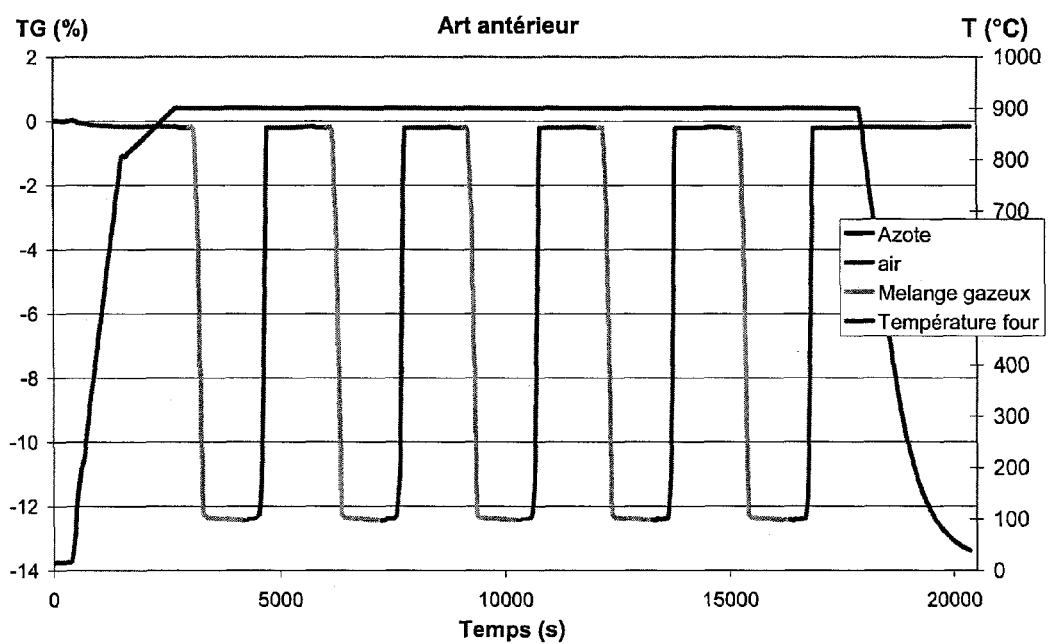

11 Claims, 8 Drawing Sheets x=0,1 x=0,075 x=0,05 x=0,025 x=0

(a)                           (b)

USE OF REDOX MASS HAVING A SPINEL TYPE STRUCTURE FOR A LOOPING REDOX PROCESS

FIELD OF THE INVENTION

The present invention relates to the use of a novel type of a redox active mass in CLC (Chemical Looping Combustion) processes, the term "chemical looping" referring to a looping redox process on an active mass.

The field of the present invention is the sphere of energy production, by gas turbines, boilers and ovens, notably for the petroleum industry, the glass industry and cement plants. It also covers the use of such means for electricity, heat or vapour production.

The field of the invention more particularly concerns devices and processes allowing to produce, using redox reactions of an active mass, referred to as redox mass, a hot gas from a hydrocarbon, for example natural gas, coals or petroleum residues, or from a hydrocarbon mixture, and to isolate the carbon dioxide so as to be able to capture it.

The increase in the world energy demand leads to the building of new thermal power plants and to the emission of increasing amounts of carbon dioxide harmful to the environment. Capture of carbon dioxide for sequestration has thus become an imperative necessity.

One of the techniques that can be used to capture carbon dioxide consists in carrying out redox reactions of an active mass in a CLC process. A first reaction of oxidation of the active mass with air or another gas acting as the oxidizer allows, because of the exothermic character of the oxidation, to obtain a hot gas whose energy can then be exploited. A second reaction of reduction of the oxidized active mass by means of a gas, a liquid or a reducing solid then allows to obtain a re-usable active mass, as well as a gas mixture essentially comprising carbon dioxide and water.

One interesting aspect of this technique is that it readily allows isolation of the carbon dioxide in a gas mixture practically free of oxygen and nitrogen.

BACKGROUND OF THE INVENTION

U.S. Pat. No. 5,447,024 describes a CLC process comprising a first reduction reactor for reducing an active mass by means of a reducing gas and a second oxidation reactor allowing to restore the active mass in its oxidized state by means of an oxidation reaction with humidified air.

The active mass changing alternately from its oxidized form to its reduced form and vice-versa follows a redox cycle. It can be noted that, in general, the terms oxidation and reduction are used in connection with the oxidized and reduced state of the active mass respectively. The oxidation reactor is the reactor wherein the redox mass is oxidized and the reduction reactor is the reactor wherein the redox mass is reduced.

The gaseous effluents from the two reactors are preferably fed into the gas turbines of an electric power plant. The process described in this patent allows isolation of the carbon dioxide from the nitrogen, which thus facilitates carbon dioxide capture.

The aforementioned document used the circulating bed technology to allow continuous change of the active mass from its oxidized state to its reduced state.

Thus, in the reduction reactor, the active mass (MA) is first reduced to the state $M_xO_{y-2n-+m/2}$ by means of a hydrocarbon $C_nH_m$ that is correlatively oxidized to $CO_2$ and $H_2O$ according to reaction (1), or possibly to the mixture $CO+H_2$ depending on the proportions used.

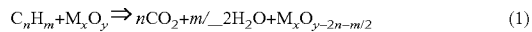
(1)

In the oxidation reactor, the active mass is restored to its oxidized state ($M_xO_y$) on contact with air according to reaction (2), prior to returning to the first reactor.

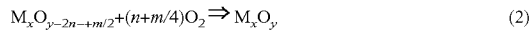
(2)

The same document claims as the active mass the use of the redox pair NiO/Ni, alone or associated with binder YSZ (defined by yttrium-stabilized zirconia, also referred to as yttriated zirconia).

The interest of the binder in such an application is to increase the mechanical strength of the particles, too low to be used in a circulating bed when NiO/Ni is used alone.

Yttriated zirconia being furthermore an ion conductor for the $O^{2-}$ ions at the operating temperatures, the reactivity of the NiO/Ni/YSZ system is improved.

Many types of binders, in addition to the aforementioned yttriated zirconia (YSZ), have been studied in the literature in order to increase the mechanical strength of the particles at a lower cost than with YSZ. Examples thereof are alumina, metal aluminate spinels, titanium dioxide, silica, zirconia, kaolin.

Document EP-1,747,813 describes redox masses comprising a redox pair or a set of redox pairs, selected from the group made up of CuO/Cu, $Cu_2O$/Cu, NiO/Ni, $Fe_2O_3$/$Fe_3O_4$, FeO/Fe, $Fe_3O_4$/FeO, $MnO_2$/$Mn_2O_3$, $Mn_2O_3$/$Mn_3O_4$, $Mn_3O_4$/MnO, MnO/Mn, $Co_3O_4$/CoO, CoO/Co, in combination with a ceria-zirconia type binder allowing to increase the oxygen transfer capacity of said masses.

The reactivity of the redox masses involved in the CLC application is essential: the faster the oxidation and reduction reactions, the less the inventory of the materials required for operation of a unit is large. According to the literature (T. Mattison, A. Jardnas, A. Lyngfelt, Energy & Fuels 2003, 17, 643), the CuO/Cu pair has the highest reduction and reduction rates, before the NiO/Ni pair. The authors however note that the relatively low melting temperature of copper (1083° C.) limits its potential of use in CLC at high temperature, and the major part of the studies published on redox masses for CLC concern the NiO/Ni pair, despite its high toxicity (it is classified as CMR 1) and its high cost.

The use of the $Fe_2O_3$/$Fe_3O_4$ pair is also advantageous in relation to that of the NiO/Ni pair, despite a low oxygen transfer capacity, because of its low toxicity and low cost. However, since $Fe_3O_4$ tends to be reduced to FeO, the associated oxidation and reduction rates are reduced.

As regards more particularly the use of copper in redox masses, a publication in Fuel 83 (2004) 1749 by Diego, Garcia-Labiano et al. Shows the use of copper in CLC, the copper being deposited by impregnation on a porous support (alumina, silica, titanium, zirconia or sepiolite), and consequently a significant limitation of the amount of usable copper and therefore of the oxygen transfer capacity of the active mass. This publication specifies that the solids prepared by coprecipitation or by mechanical mixing of oxides with a high CuO content cannot be used in CLC processes.

On the other hand, another publication by these authors (L. F. de Diego, P. Gayan, F. Garcia-Labiano, J. Celaya, A. Abad, J. Adanez, Energy & Fuels 2005, 19, 1850) discloses that a 10% impregnation rate of CuO on alumina allows to avoid an agglomeration of particles harmful to the operation of the fluidized bed process, but that this agglomeration phenomenon is inevitable as soon as 20% CuO are impregnated.

The particle agglomeration phenomenon, which may compromise the use of redox masses in a fluidized bed, has also been studied by P. Cho, T. Mattison, A. Lyngfedt in Fuel 83 (2004), 1215, for redox masses comprising 60% of CuO, $Fe_2O_3$, NiO or $Mn_3O_4$ and 40% alumina used as the binder. They show that particles based on iron and copper agglomerate, unlike those based on Ni and Mn.

In general terms, the reaction of a metal (M) in the oxidation state +II (MO) with alumina leads, at the operating temperatures of CLC processes, to the formation of a spinel ($MAl_2O_4$). Spinel $NiAl_2O_4$ is poorly reactive and, according to Cho et al. (Ind. Eng. Chem. Res. 2005, 44, 668), spinels $CuAl_2O_4$ and $MnAl_2O_4$ are not reactive either. In order to avoid the oxygen capacity decrease induced by the formation through reaction of MO with $Al_2O_3$, the spinel itself can be used as a binder, but this involves an additional cost as a result of the introduction of a non-reactive metal.

Surprisingly, the claimant has discovered that using in the CLC application a redox mass of a particular type can overcome the drawbacks linked with the cost, the toxicity and the agglomeration of particles compromising use in a fluidized bed, while having a high oxygen transfer capacity and improved oxidation and reduction rates.

DETAILED DESCRIPTION

The present invention relates to a novel type of active mass in looping redox processes.

More precisely, the invention concerns a redox active mass containing a spinel of formula $Cu_{1-x}Fe_{1+x}AlO_4$ with $0 \leq x \leq 0.1$.

The spinel group is made up of oxides whose structure reproduces that of the mineral spinel $MgAl_2O_4$. Examples of oxides having a spinel structure are many natural compounds such as magnetite ($Fe_3O_4$), chromite ($FeCr_2O_4$), gahnite ($ZnAl_2O_4$). The general formula of spinels is $AB_2O_4$, where A is a bivalent cation and B a trivalent cation. In the spinel structure, the oxide ions ($O^2$) form a face-centered cubic network. This network has two types of interstitial sites: tetrahedral sites and octahedral sites. The cubic primitive unit cell of the spinel network has in particular 64 tetrahedral sites, among which only 8 are occupied by metal ions, and 32 octahedral sites, among which 16 are occupied. Two types of particular cation arrangements have been observed. In spinels of normal type, the trivalent ions occupy the octahedral sites and the bivalent ions occupy the tetrahedral sites. Each oxide ion is thus combined with a bivalent ion and three trivalent ions. In inverse type spinels, the tetrahedral sites are occupied by one half of the trivalent ions and the octahedral sites by the other half of the trivalent ions and by the divalent ions. There are also spinels where the two types of cations occupy both the tetrahedral and the octahedral sites: mixed spinels for which the previous two cases are limit cases (SMIT and WIJN, Les Ferrites, Techn. Philipps, 1961).

Oxides of spinel structure can be prepared by means of the sintering method commonly used in the ceramics industry. This method comprises the following operations. The metal oxides, carbonates or other compounds from which the spinel is formed after a reaction in the solid state are homogeneously mixed, then humidified and crushed. After drying, and possibly shaping through pressing, the powder obtained is brought to a sufficient temperature (around 1000° C.) to cause the chemical reaction between the reactants. In order to improve the homogeneity within the structure of the material, the powder obtained can be crushed and mixed again, then brought to high temperature. These operations can be repeated as often as necessary.

Synthesis of the spinel can also be carried out using the method referred to as solution combustion synthesis, wherein a stoichiometric mixture of metal precursors (nitrates, acetates, oxalates, ...) of the desired spinel and of a water-soluble fuel, urea for example, is heated until ignition of the mixture.

The spinel can also be prepared by impregnation of an oxide, alumina for example, with a metal precursor (nitrate, acetate, oxalate, ...), followed by calcination at a sufficient temperature for spinel formation, typically at a temperature above 600° C. A composite material whose core consists of the support oxide ($Al_2O_3$) and the periphery of spinel ($MAl_2O_4$) is thus obtained.

Preferably, synthesis of the spinel is carried out by coprecipitation of a mixture of metal precursors selected from the group made up of nitrates, acetates and oxalates, by a base. This base is for example soda, potash or ammonium hydroxide. The precipitate obtained is then washed, dried and calcined at a sufficient temperature promoting spinel formation, preferably above 600° C.

The claimant has discovered that using, in a CLC type process, a redox active mass containing a spinel $Cu_{1-x}Fe_{1+x}AlO_4$ with $0 \leq x \leq 0.1$ as defined above allows to have a mass with a low cost price and a low toxicity level in comparison with nickel-based masses.

Furthermore, the active mass according to the invention has a high oxygen transfer capacity, as well as high oxidation and reduction rates.

The redox mass can come in form of powder, balls, extrudates or washcoat deposited on a monolith type substrate.

Preferably, no binder is associated with the redox mass because it has a negative impact on the oxygen transfer capacity.

The redox mass according to the invention can however be used in combination with a binder, and/or with a redox pair or a set of redox pairs, selected from the group made up of $CuO/Cu$, $Cu_2O/Cu$, $NiO/Ni$, $Fe_2O_3/Fe_3O_4$, $FeO/Fe$, $Fe_3O_4/FeO$, $MnO_2/Mn_2O_3$, $Mn_2O_3/Mn_3O_4$, $Mn_3O_4/MnO$, $MnO/Mn$, $CO_3O_4/CoO$, $CoO/Co$.

When a binder is used, it preferably contains ceria-zirconia that is used either alone or in admixture with other types of binders such as alumina, spinel type aluminates, silica, titanium dioxide, kaolin, YSZ, perovskites. Preferably, the binders other than ceria-zirconia are selected from the subgroup made up of alumina, aluminates, YSZ and perovskites.

The proportion of binder in the redox mass ranges between 10 and 95 wt. %, preferably between 20 and 80 wt. % and more preferably between 30 and 70 wt. %. Advantageously, a binder is a mixed oxide containing ceria-zirconia (Ce/Zr), of general formula $Ce_xZr_{1-x}O_2$, with x ranging between 0.05 and 0.95, preferably between 0.5 and 0.9.

The redox mass according to the present invention can be used, depending on applications, in a circulating bed, in a rotary reactor, or a simulated rotary reactor, as described in French patent applications FR-2,846,710 and FR-2,873,750.

EXAMPLE

In this example, we compare the performances of a redox mass according to the prior art, described in document U.S. Pat. No. 5,447,024, with 5 redox masses (samples) according to the present invention, of formula $Cu_{1-x}Fe_{1+x}AlO_4$ with $0 \leq x \leq 0.1$, wherein x=0.1; 0.075; 0.05; 0.025; 0.

Figure 2:
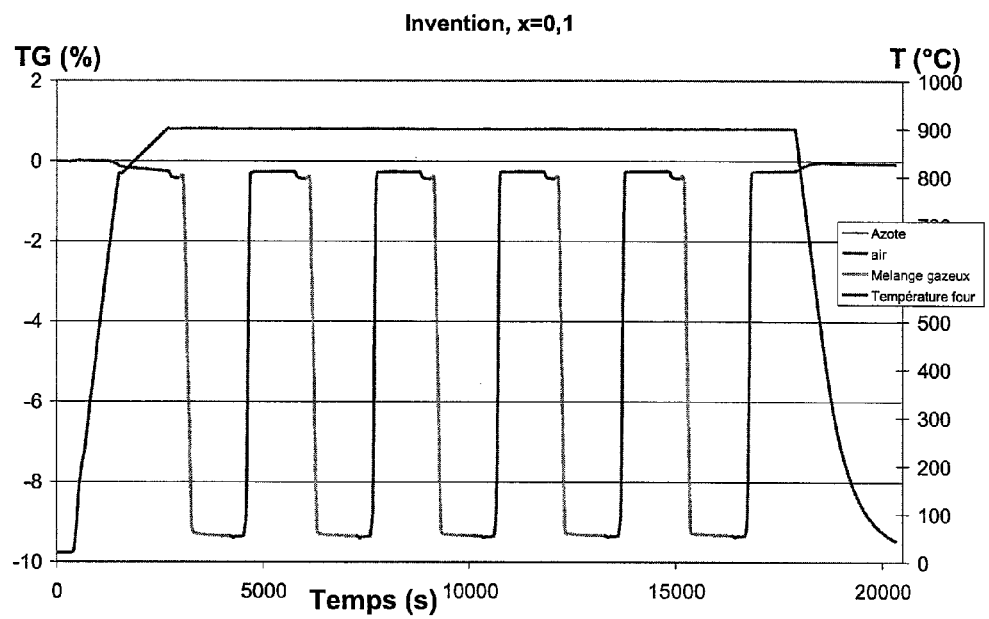
Figure 3:
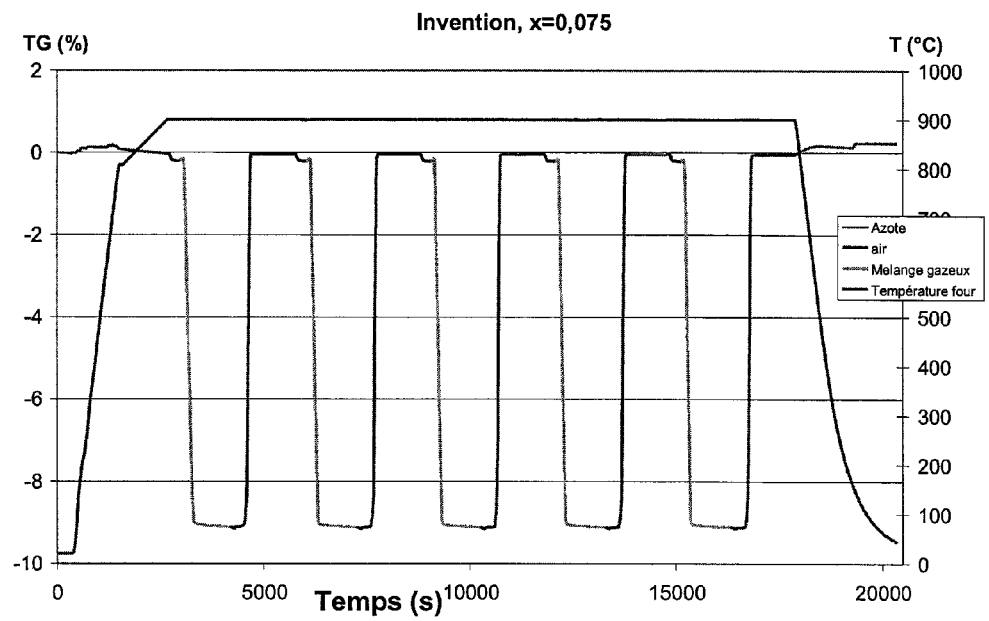
Figure 4:
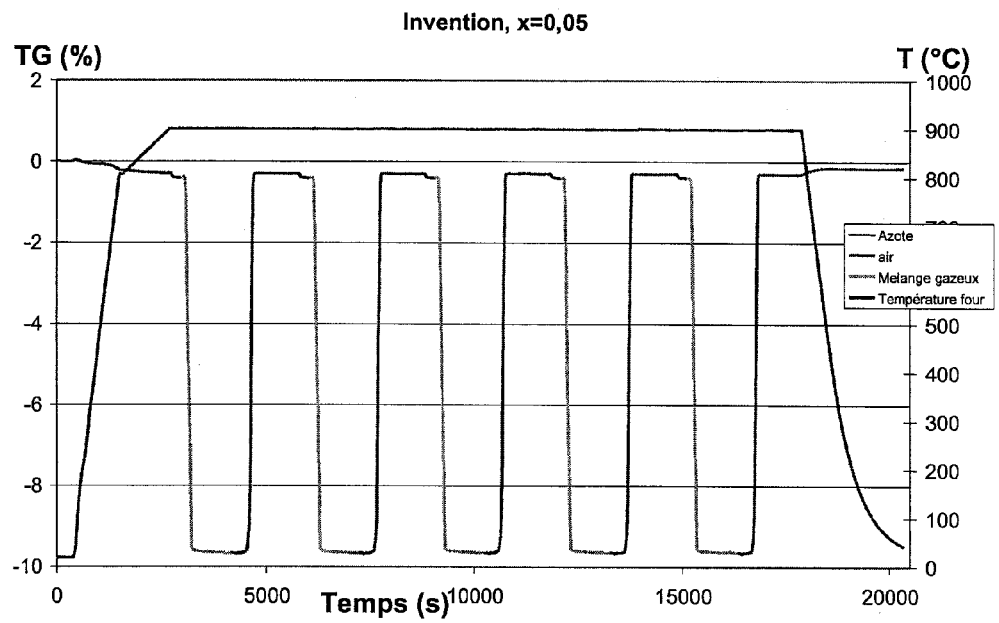
Figure 5:
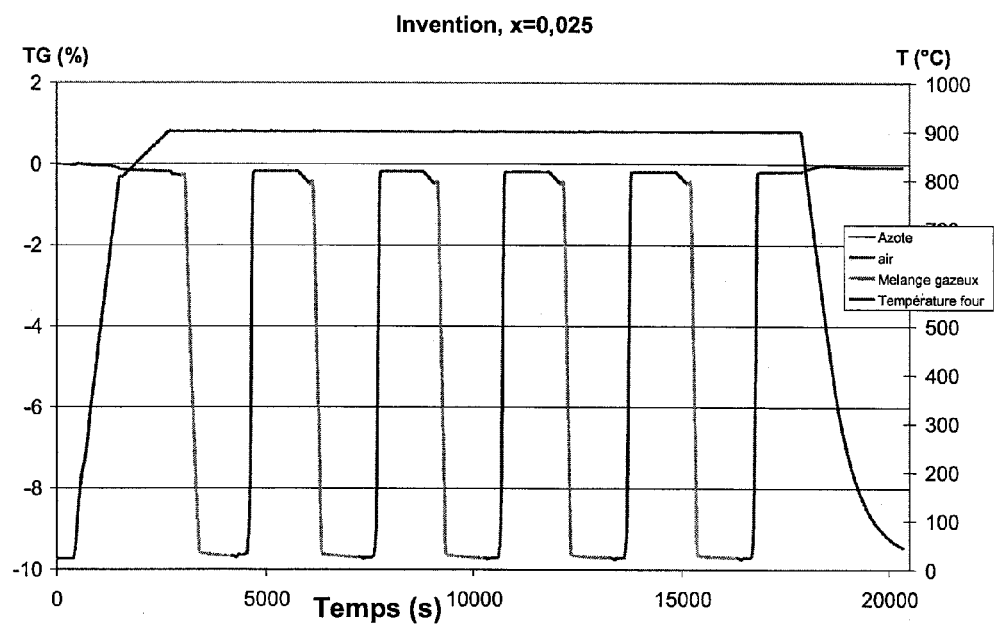
Figure 6:
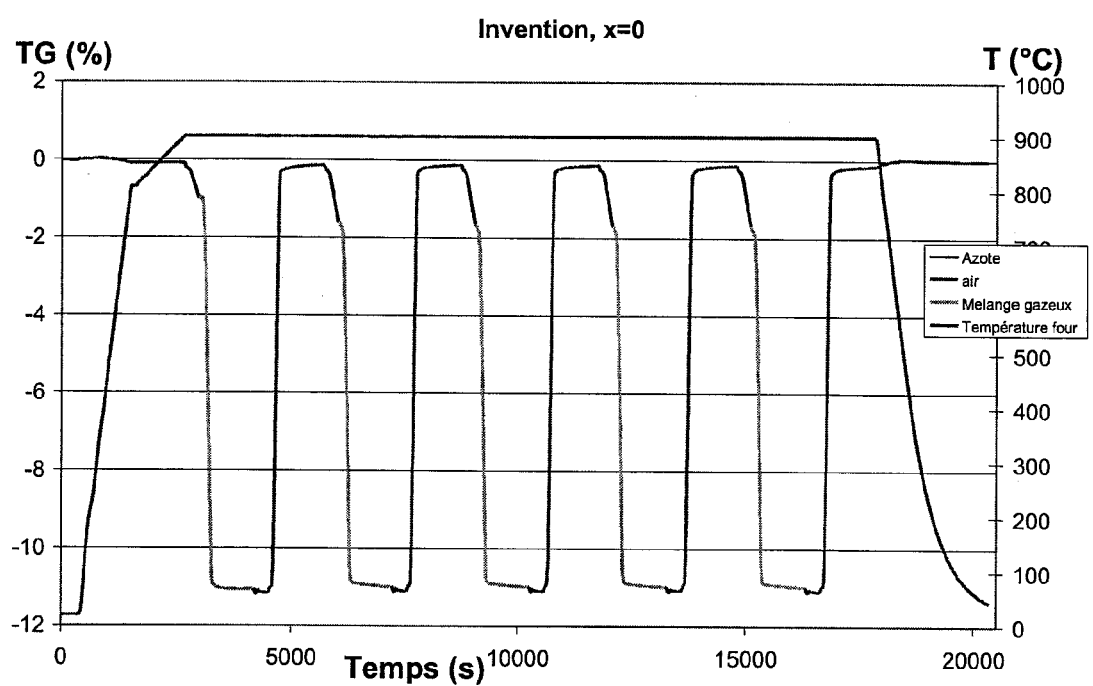
Figure 7:
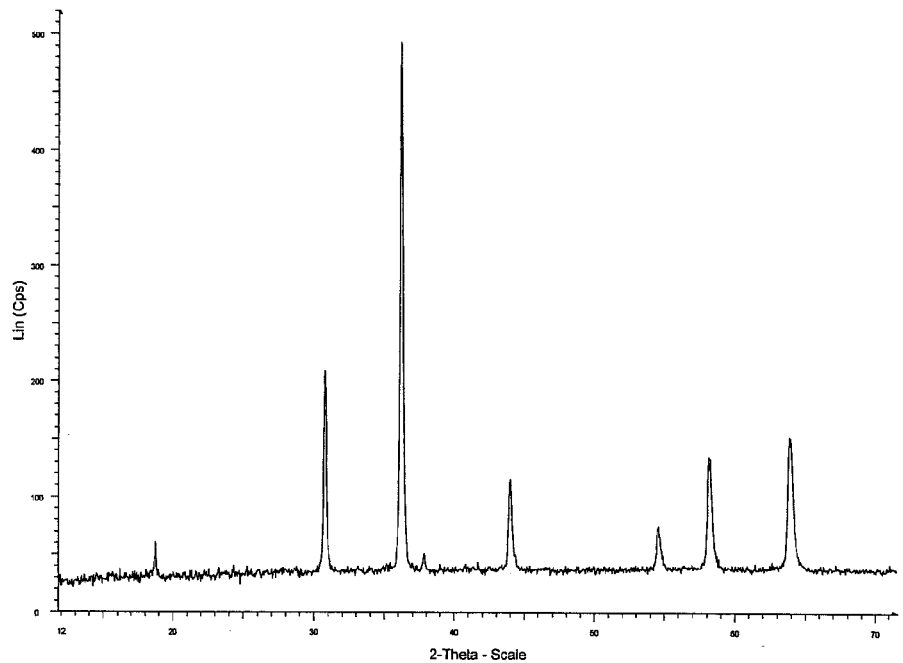
Figure 8:
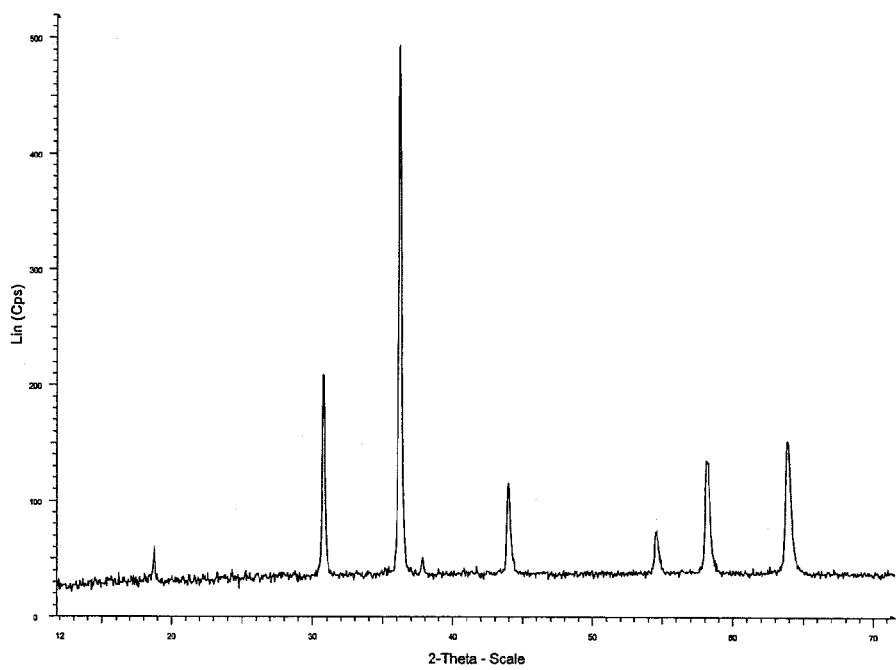
Figure 9:
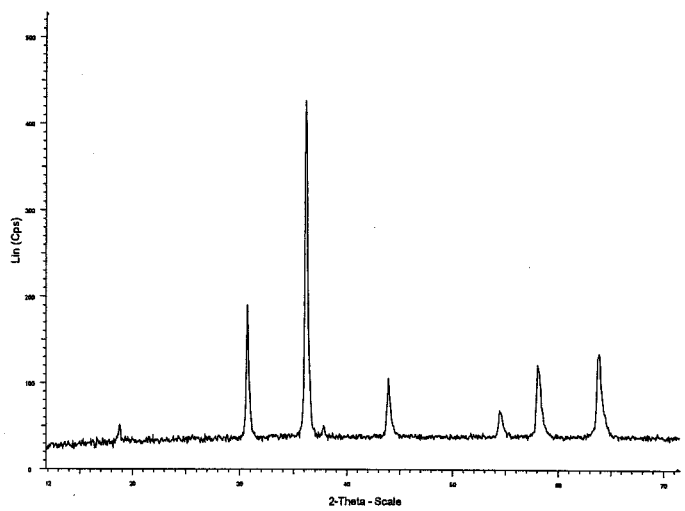
Figure 10:
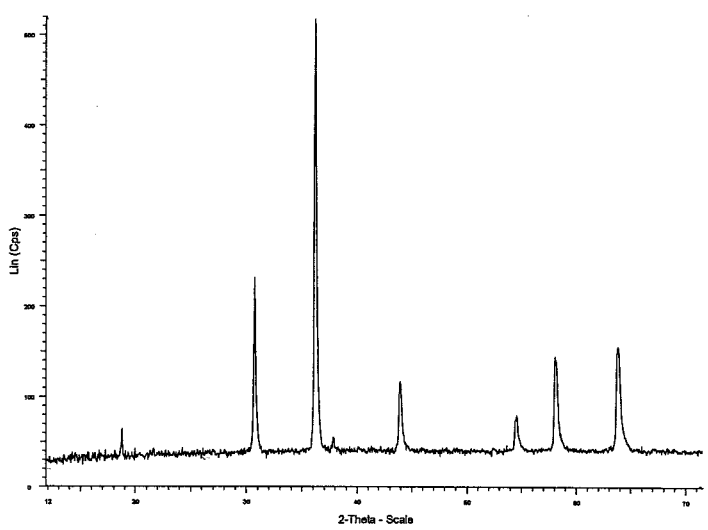
Figure 11:
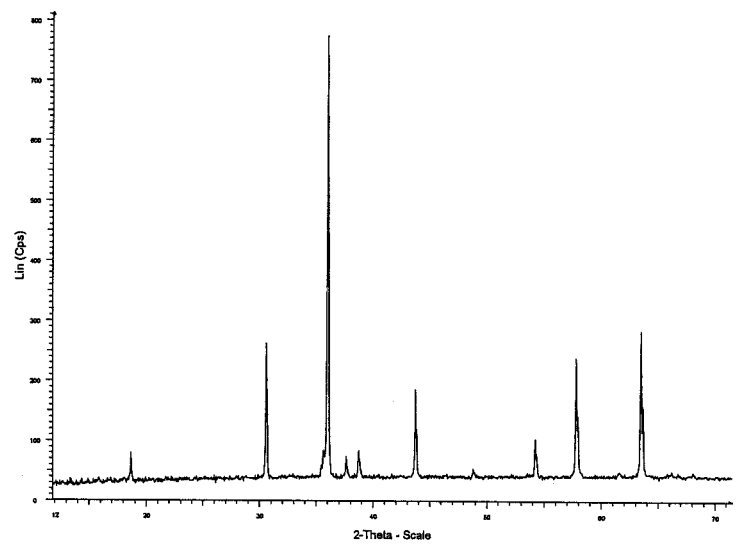
Figure 12:
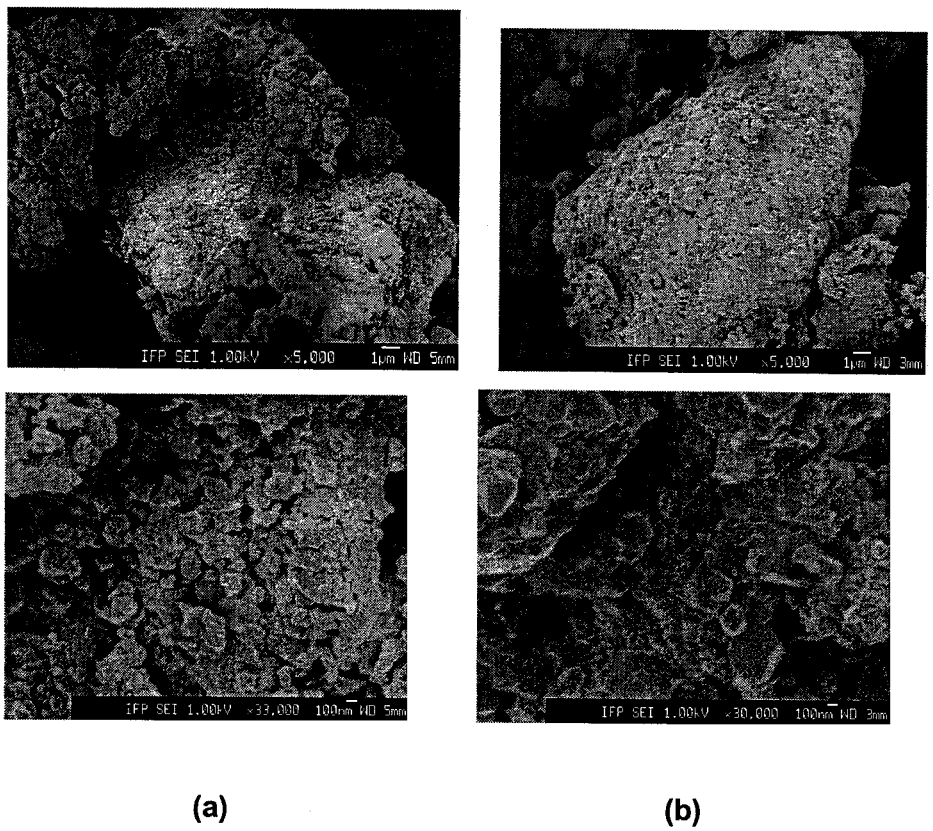

This example is accompanied by the following figures:

FIG. 1: evolution of the mass of the sample according to the prior art as a function of the reducing or oxidizing atmosphere, at 900° C., FIG. 2: evolution of the mass of the sample according to the invention for which x=0.1 as a function of the reducing or oxidizing atmosphere, at 900° C., FIG. 3: evolution of the mass of the sample according to the invention for which x=0.075 as a function of the reducing or oxidizing atmosphere, at 900° C., FIG. 4: evolution of the mass of the sample according to the invention for which x=0.05 as a function of the reducing or oxidizing atmosphere, at 900° C., FIG. 5: evolution of the mass of the sample according to the invention for which x=0.025 as a function of the reducing or oxidizing atmosphere, at 900° C., FIG. 6: evolution of the mass of the sample according to the invention for which x=0 as a function of the reducing or oxidizing atmosphere, at 900° C., FIG. 7: diffractogram of the sample according to the invention for which x=0.1, FIG. 8: diffractogram of the sample according to the invention for which x=0.075, FIG. 9: diffractogram of the sample according to the invention for which x=0.05, FIG. 10: diffractogram of the sample according to the invention for which x=0.025, FIG. 11: diffractogram of the sample according to the invention for which x=0, FIG. 12: SEM images of the redox mass according to the invention before (a) and after (b) testing for the spinel corresponding to the formula $Cu_{0.95}Fe_{1.05}AlO_4$ (x=0.05).

The redox mass according to the prior art is a nickel oxide NiO using as the binder an yttriated zirconia solution prepared as follows:

$Ni(NO_3)_2$, $Y(NO_3)_3$ and $ZrO(NO_3)_2$ are mixed in aqueous solution, then soda is added, up to pH 8, at ambient temperature. The precipitate formed is then filtered, dried and calcined at 1000° C. for 2 h in order to obtain a material comprising 60 mass % NiO and an yttrium-stabilized solid zirconia solution (confirmed by X-ray diffraction), containing 84 mass % zirconia and 16% yttria (i.e. an yttriated zirconia containing 9 mol. % $Y_2O_3$).

The oxygen transfer capacity calculated by considering that only the NiO/Ni pair can be reduced and oxidized according to equilibrium (3) is 12.85 mass %.

$$NiO \leftrightarrow Ni + \tfrac{1}{2}O_2 \quad (3)$$

The redox masses according to the invention are prepared by precipitation with soda, at ambient temperature, of a mixture of copper nitrate, iron nitrate and aluminium nitrate in stoichiometric proportions so as to form the spinel $Cu_{1-x}Fe_{1+x}AlO4$ (x=0.1; 0.075; 0.05; 0.025; 0). The precipitate formed is then filtered, washed with distilled water, dried and calcined at 1000° C. for 2 h. The X-ray powder diffractograms obtained for x=0.1, 0.075, 0.05 and 0.025 confirm the formation of spinels. For the spinel $CuFeAlO_4$ (x=0), tenorite (CuO) is detected.

The synthesized solids are tested without using a binder.

The theoretical oxygen transfer capacity of the 5 spinels $Cu_{1-x}Fe_{1+x}AlO4$ calculated by considering that only the CuO/Cu and $Fe_2O_3/Fe_3O_4$ pairs can be reduced and oxidized according to equilibria (4) and (5) is respectively 9.67, 9.79, 9.91, 10.03 and 10.14 mass % for x=0.1, 0.075, 0.05, 0.025 and 0.

$$CuO \leftrightarrow Cu + \tfrac{1}{2}O_2 \quad (4)$$

$$3Fe_2O_3 \leftrightarrow 2Fe_3O_4 + \tfrac{1}{2}O_2 \quad (5)$$

A SETARAM thermobalance is equipped with a gas delivery automaton allowing to simulate the successive reduction and oxidation stages undergone by the particles in a CLC type process.

The tests are carried out at a temperature of 900° C., with 65 mg (±2 mg) sample contained in a Pt boat. In order to allow comparison between the various samples, the size distribution of the particles is selected between 30 and 40 μm by screening. The reduction gas used consists of 10% $CH_4$, 25% $CO_2$ and 65% $N_2$, and the oxidation gas is dry air.

For safety reasons, nitrogen sweep of the thermobalance ovens is carried out systematically between the oxidation and reduction stages.

For each sample, five successive reduction/oxidation cycles are carried out according to the protocol as follows:
1) Temperature rise under air (50 ml/min):
From 20° C. to 800° C.: 40° C./min
From 800° C. to 900° C.: 5° C./min
2) Nitrogen sweep for 5 min 15 s, flow rate 80 ml/min
3) Injection of a $CH_4/CO_2$ mixture for 20 min, at 50 ml/min
4) Nitrogen sweep for 5 min 15 s
5) Air injection, 20 min, 50 ml/min.

Stages 2 to 5 are repeated four additional times at 900° C.

The results obtained for the mass of the prior art and the masses according to the invention are gathered in FIGS. 1 to 6 respectively. These figures show the evolution of the relative weight loss and regain of the sample as a function of time for 5 successive reduction/oxidation cycles. In accordance with the protocol described above, the nature of the gases used varies during the progress of each cycle.

TABLE 1

Average of the mass losses and gains observed upon reduction and oxidation (respectively) by the redox masses according to the prior art and according to the invention

|  | Prior art | Invention |  |  |  |  |
|---|---|---|---|---|---|---|
|  |  | x = 0 | x = 0.025 | x = 0.05 | x = 0.075 | x = 0.1 |
| Reduction | −12.23% | −10.88% | −9.51% | −9.35% | −9.07% | −9.08% |
| Oxidation | 12.17% | 10.87% | 9.51% | 9.35% | 9.07% | 9.08% |

The measured oxygen transfer capacity of the redox masses according to the invention and according to the prior art does practically not vary from one cycle to the next, over five successive reduction/oxidation cycles at 900° C. For $0 \leq x \leq 0.1$, this capacity is very close to and below the theoretical capacity calculated by taking into account only the reduction of CuO to Cu and of $Fe_2O_3$ to $Fe_3O_4$: it thus appears that the structure of the spinel considerably slows down the reduction kinetics of $Fe_3O_4$ to FeO by methane.

The comparison of the reduction and oxidation rates is as follows:

TABLE 2

Measured average reduction and oxidation rates

|  | reduction rate/ mmol $O_2$/min · g | oxidation rate/mmol $O_2$/min · g |
|---|---|---|
| prior art | 0.72 ± 0.02 | 2.01 ± 0.01 |
| invention, x = 0.1 | 1.04 ± 0.13 | 1.90 ± 0.03 |
| invention, x = 0.075 | 1.00 ± 0.14 | 1.94 ± 0.03 |
| invention, x = 0.05 | 1.16 ± 0.07 | 1.94 ± 0.02 |
| invention, x = 0.025 | 1.01 ± 0.10 | 1.98 ± 0.02 |
| invention, x = 0 | 1.09 ± 0.10 | 1.98 ± 0.03 |

The reduction and oxidation rates are calculated from the slopes linked with the mass loss and gain (respectively) observed, between the second and the third minute after passing in a reducing gas stream, and averaged over the five redox cycles.

Consequently, the redox mass according to the invention has a reduction rate that is respectively 44, 39, 61, 40 or 51% higher, depending on whether x=0.1, 0.075, 0.05, 0.025 and 0, than the rate observed with the redox mass according to the prior art. The redox mass according to the invention has an oxidation rate that is substantially equal to the rate observed with the redox mass according to the prior art, whatever the value of x between 0 and 0.1.

Ultimately, the high gain obtained for the reduction rate with the active mass according to the invention widely compensates for the slightly lower oxygen transfer capacity thereof, and such a reduction rate increase thus allows to consider, under isoperformance conditions, using a smaller amount of material.

The SEM (Scanning Electron Microscopy) images of the redox mass according to the invention for x=0.05 (FIG. 12) before (FIG. 12.*a*) and after testing (FIG. 12.*b*) on the thermobalance show that the particles have not agglomerated during the test.

The invention claimed is:

1. A looping redox process or Chemical Looping Process (CLC) process, comprising reducing and oxidizing a redox mass containing a spinel of formula $Cu_{1-x}Fe_{1+x}AlO_4$ with $0 \leq x \leq 0.1$.

2. The looping redox process or CLC process as claimed in claim 1, wherein synthesis of the spinel is carried out in a coprecipitation stage.

3. The looping redox process or CLC process as claimed in claim 2, wherein said coprecipitation stage is carried out by coprecipitation of a mixture of metal precursors by a base, the metal precursors being selected from the group consisting of nitrates, acetates and oxalates.

4. The looping redox process or CLC process as claimed in claim 1, wherein the redox mass does not contain a binder.

5. The looping redox process or CLC process as claimed in claim 1, said redox mass being used in combination with a binder or with a redox pair or a set of redox pairs, selected from the group consisting of $CuO/Cu$, $Cu_2O/Cu$, $NiO/Ni$, $Fe_2O_3/Fe_3O_4$, $FeO/Fe$, $Fe_3O_4/FeO$, $MnO_2/Mn_2O_3$, $Mn_2O_3/Mn_3O_4$, $Mn_3O_4/MnO$, $MnO/Mn$, $Co_3O_4/CoO$, and $CoO/Co$.

6. The looping redox process or CLC process as claimed in claim 5, wherein the binder is introduced in a proportion ranging between 10 and 95 wt. % and contains ceria-zirconia that is used either alone or in admixture with other binders selected from the group consisting of alumina, spinel aluminates, silica, titanium dioxide, kaolin, yttrium-stabilized zirconia, and perovskites.

7. The looping redox process or CLC process as claimed in claim 6, wherein the binders other than ceria-zirconia are selected from the group consisting of alumina, aluminates, yttrium-stabilized zirconia and perovskites.

8. The looping redox process or CLC process as claimed in claim 1, said redox mass being in the form of powder, balls, extrudates, or washcoat deposited on a monolith substrate.

9. The looping redox process or CLC process as claimed in claim 1, wherein the process uses an oxidation reactor and a reduction reactor operating in a circulating bed.

10. The looping redox process or CLC process as claimed in claim 1, wherein the process uses a rotary reactor.

11. The looping redox process or CLC process as claimed in claim 1, wherein the process uses a simulated rotary reactor.

* * * * *